United States Patent
Lee et al.

(10) Patent No.: US 7,171,123 B2
(45) Date of Patent: Jan. 30, 2007

(54) METHOD FOR DECREASING AND COMPENSATING THE TRANSMISSION LOSS AT A WAVELENGTH-DIVISION-MULTIPLEXED PASSIVE OPTICAL NETWORK AND AN APPARATUS THEREFOR

(75) Inventors: Chang Hee Lee, Daejon (KR); Tae Won Oh, Daegu (KR); Kwang Uk Chu, Daejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 565 days.

(21) Appl. No.: 10/353,745

(22) Filed: Jan. 28, 2003

(65) Prior Publication Data
US 2003/0142978 A1 Jul. 31, 2003

(30) Foreign Application Priority Data
Jan. 30, 2002 (KR) ............... 10-2002-0005326

(51) Int. Cl.
*H04J 14/02* (2006.01)
(52) U.S. Cl. .................. 398/82; 359/341.2; 385/24
(58) Field of Classification Search ............ 359/341.2; 398/180; 385/24
See application file for complete search history.

(56) References Cited

U.S. PATENT DOCUMENTS

| 5,625,478 A | * | 4/1997 | Doerr et al. ................. 398/4 |
| 6,941,074 B2 | * | 9/2005 | Nakamura et al. .......... 398/92 |
| 2002/0067526 A1 | * | 6/2002 | Park et al. ................... 359/127 |

\* cited by examiner

*Primary Examiner*—Leslie Pascal
(74) *Attorney, Agent, or Firm*—Sheridan Ross P.C.

(57) ABSTRACT

The present invention relates to a wavelength-division multiplexed passive optical network. In particular, it relates to a technology for minimizing the optical loss at a wavelength-division multiplexed passive optical network based on wavelength-locked light source Thereby it improves the transmission quality and increases the transmission distance.

A 4-port optical path setting device of the present invention increases the amount of light injected into an optical transmitter and thereby improves the wavelength-locking characteristic of a light source. In addition, it can decrease the optical transmission loss in an optical transmission path, and by an optical amplifier being inserted therein; it can also compensate the optical loss in an optical transmission path.

In the present invention, a 4-port optical path setting device having the characteristics described above and a method for fault recovery without an additional optical loss are presented.

8 Claims, 6 Drawing Sheets

METHOD FOR DECREASING AND COMPENSATING THE TRANSMISSION LOSS AT A WAVELENGTH-DIVISION-MULTIPLEXED PASSIVE OPTICAL NETWORK AND AN APPARATUS THEREFOR

BACKGROUND OF THE INVENTION

1. Field of the Invention

The present invention relates to a wavelength-division multiplexed passive optical network. In particular, it relates to a technology for minimizing the optical loss at a wavelength-division multiplexed passive optical network based on wavelength-locked wavelength-division-multiplexed light sources. It improves the transmission quality and increases the transmission distance.

2. Description of the Related Art

A wavelength-division-multiplexed passive optical network includes a central office, subscribers and an optical distribution network. The optical distribution network connects between the subscribers and the central office without any element requiring the electrical power supply. The optical distribution network has an optical fiber cable and a remote distribution node such as wavelength-division multiplexer/demultiplexer. Wavelength-division multiplexed optical signals are transmitted through an optical fiber cable between the central base station and a remote distribution node. The specific wavelength is allocated to each subscriber.

A wavelength-division multiplexed passive optical network requires numbers of light sources having different wavelengths for allocating at least one wavelength to each subscriber. It also requires a means for recovering faults possibly being occurred at an optical path between the central office and a remote distribution node.

FIG. 1 and FIG. 2 are views illustrating the embodiments of a prior wavelength-division multiplexed passive optical network system.

FIG. 1 shows an embodiment of a wavelength-division multiplexed passive optical network using wavelength-locked wavelength-division-multiplexed light sources. This kind of system is presented in prior documents Kwang-Wook Choo, Chang-Hee Lee and Tae-Won Oh, "Wavelength-division-multiplexing passive optical network based on wavelength-locked wavelength-division-multiplexed light sources through injected incoherent light", being applied for Korean Patent with an application number of 10-2002-0003318).

Referring to FIG. 1, the wavelength-division-multiplexing passive-optical-network includes a first broadband light source (112) and a second broadband light source (111). The first broadband light source (112) supplies an optical signal containing a first band of wavelengths to a first plurality of optical transmitters (101~103). The second broadband light source (111) supplies an optical signal containing a second band of wavelengths to a second plurality of optical transmitters (119~121). A fiber (114) is used for bidirectional transmission of optical signals in at least two different wavelength bands.

A optical coupler (113) operating in both the first band of wavelengths and the second band of wavelengths, wherein the first broadband light source (112) and the second broadband light source (111) couple to the fibers through the optical coupler.

Optical multiplexer/demultiplexers (110, 115) multiplex and demultiplex bi-directionally both the optical signal containing the first band of wavelengths and the optical signal containing the second band of wavelengths.

The broadband filters (107~109, 116~118) split the first band of wavelengths and the second band of wavelengths signals to different ports. One port of the broadband filters couples to the first optical transmitter and the other port couples to the second optical receiver.

The first optical multiplexer/demultiplexer (110) spectrally slices a first band of wavelengths received from the first broadband light source (112) and demultiplexes a second band of wavelengths received from the second optical multiplexer/demultiplexer (115). Each optical transmitter in the first group of optical transmitters (101–103) receives a discrete spectrally sliced signal in the first band of wavelengths and aligns the operating wavelength of that optical transmitter to the center wavelength of the received spectrally sliced signal Similarly, the second optical multiplexer/demultiplexer (115) spectrally slices a second band of wavelengths received from the second broadband light source (111) and demultiplexes a first band of wavelengths received from the first optical multiplexer/demultiplexer (110). Each optical transmitter in the second group of optical transmitters (119–121) receives a discrete spectrally sliced signal in the second band of wavelengths and aligns the operating wavelength of that optical transmitter to the center wavelength of the received spectrally sliced signal.

The optical transmitters (101~103, 119~121) are Fabry Perot laser diodes or reflective semiconductor amplifiers.

In the embodiment of a wavelength-division multiplexed passive optical network described above, a optical coupler (113) is used for coupling the first broadband light source (112) and the second broadband light source (111) to the fibers. Moreover, the down-stream signals from the central office to subscribers and the up-stream signals from subscribers to the central office pass the optical coupler (113). The optical coupler (113) is the 2×2 optical splitter, typically 3 dB splitter. The optical splitter causes unnecessary additional optical loss not only at coupling the broadband light source (111–112) to the fibers, but also at the pass of the up-stream signals and the down-stream signals. It increases the optical power of the broadband light source and decreases the transmission length. FIG. 2 shows an embodiment of a network system wherein a fault recovery means, presented in "ITU-T G.983.1 Broadband Optical Access Systems Based on Passive Optical Networks", a standard proposed by International Telecommunication Union, is applied to the system described in FIG. 1.

If a fault is occurred in an optical cable (114) between a central office and a remote distribution node, all the subscribers can not communicate with each other, and thus a fault recovery function is definitely required.

Referring to FIG. 2, by installing a 1×2 optical spatial switch (206) at the central office, an optical coupler (209) at a remote distribution node (210), the first optical fiber cable (207), and the second optical fiber cable (208), a communication can be carried out through a second optical cable (208) when a trouble is occurred in a first optical cable (207). With this method, however, a optical loss, typically 3 dB, is additionally occurred due to the optical splitter (209) used at a remote distribution node.

As mentioned above, the optical loss, occurred at coupling broadband light sources to the fibers in a wavelength-division multiplexed passive optical network should be minimized. Besides, the optical path loss of signals, occurred when they are being transmitted from an optical transmitter to an optical receiver, makes much effect on transmission quality and expandability. And thus, an appropriate method to minimize and/or compensate the optical loss is required.

SUMMARY OF THE INVENTION

The present invention is proposed to solve the problems of the prior art mentioned above. It is therefore the object of the present invention to minimize the optical loss at a wavelength-division multiplexed passive optical network based on wavelength-locked wavelength-division-multiplexed light sources Thereby, it improves the transmission quality and increases the transmission distance.

To achieve the object mentioned above, the present invention presents a 4-port optical path setting device and a method for fault recovery without an additional optical loss. The present invention also presents a method of decreasing and compensating the optical loss occurred in an optical transmission path.

DETAILED DESCRIPTION OF THE EMBODIMENTS

Hereinafter, referring to appended drawings, the structures and operation principles of embodiments of the present invention are described in detail.

Figure 3:
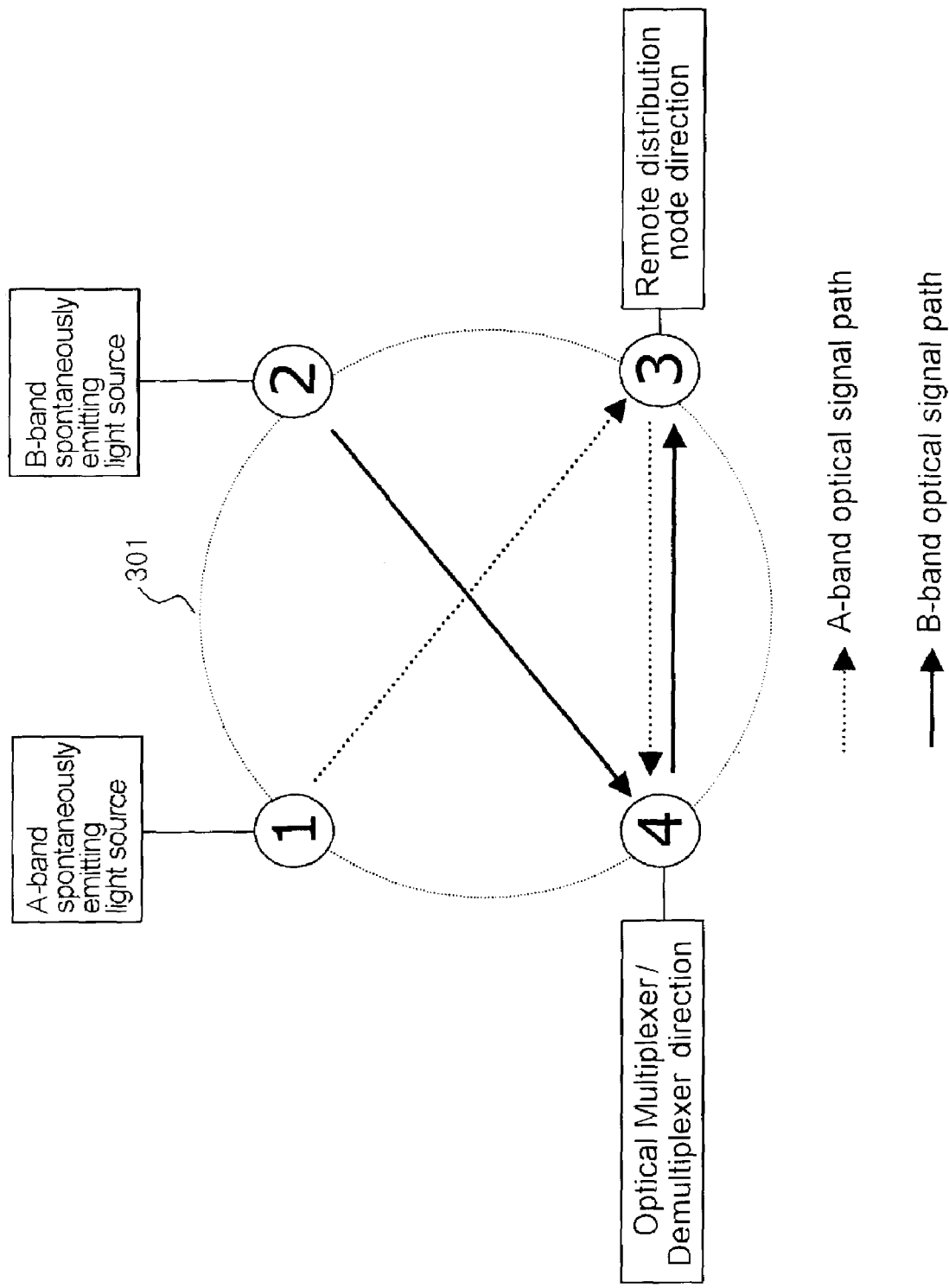
FIG. 3 is a view illustrating the operation characteristics of a 4-port optical path setting device in accordance with the present invention.

FIG. 3 is a view illustrating the operation characteristics of a 4-port optical path setting device in accordance with the present invention and its operating embodiment in a wavelength-division multiplexed passive optical network.

An A-band optical signal inputted through #1 port of the 4-port optical path setting device is outputted through #3 port. An A-band optical signal inputted through #3 port of the 4-port optical path setting device is outputted through #4 port. A B-band optical signal inputted through #2 port of the 4-port optical path setting device is outputted through #4 port. And a B-band optical signal inputted through #4 port of the 4-port optical path setting device is outputted through #3 port.

Figure 1:
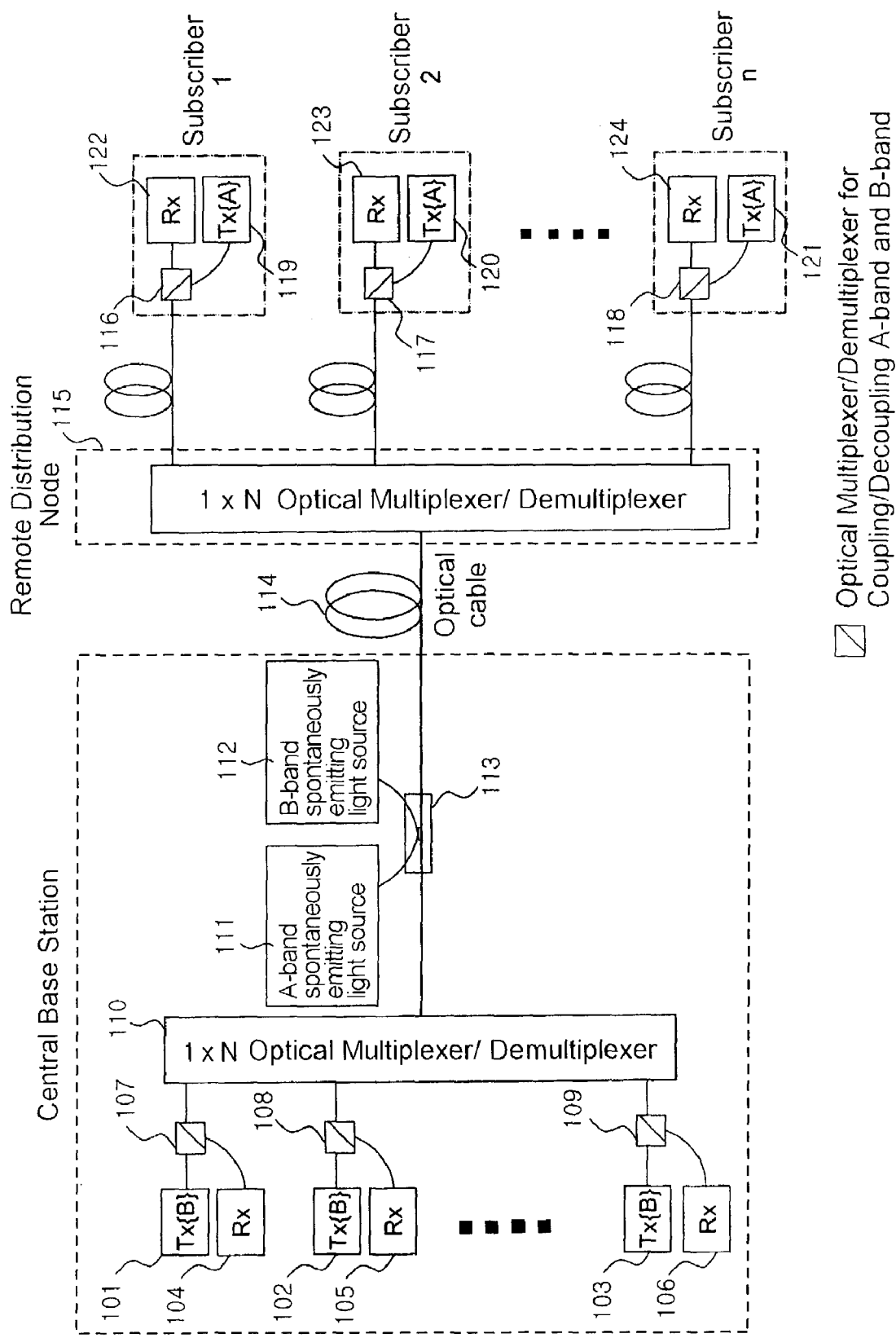
FIG. 1 is a view illustrating a wavelength-division multiplexed passive optical network using a wavelength-locked wavelength-division-multiplexed light sources in accordance with the prior art.
Figure 2:
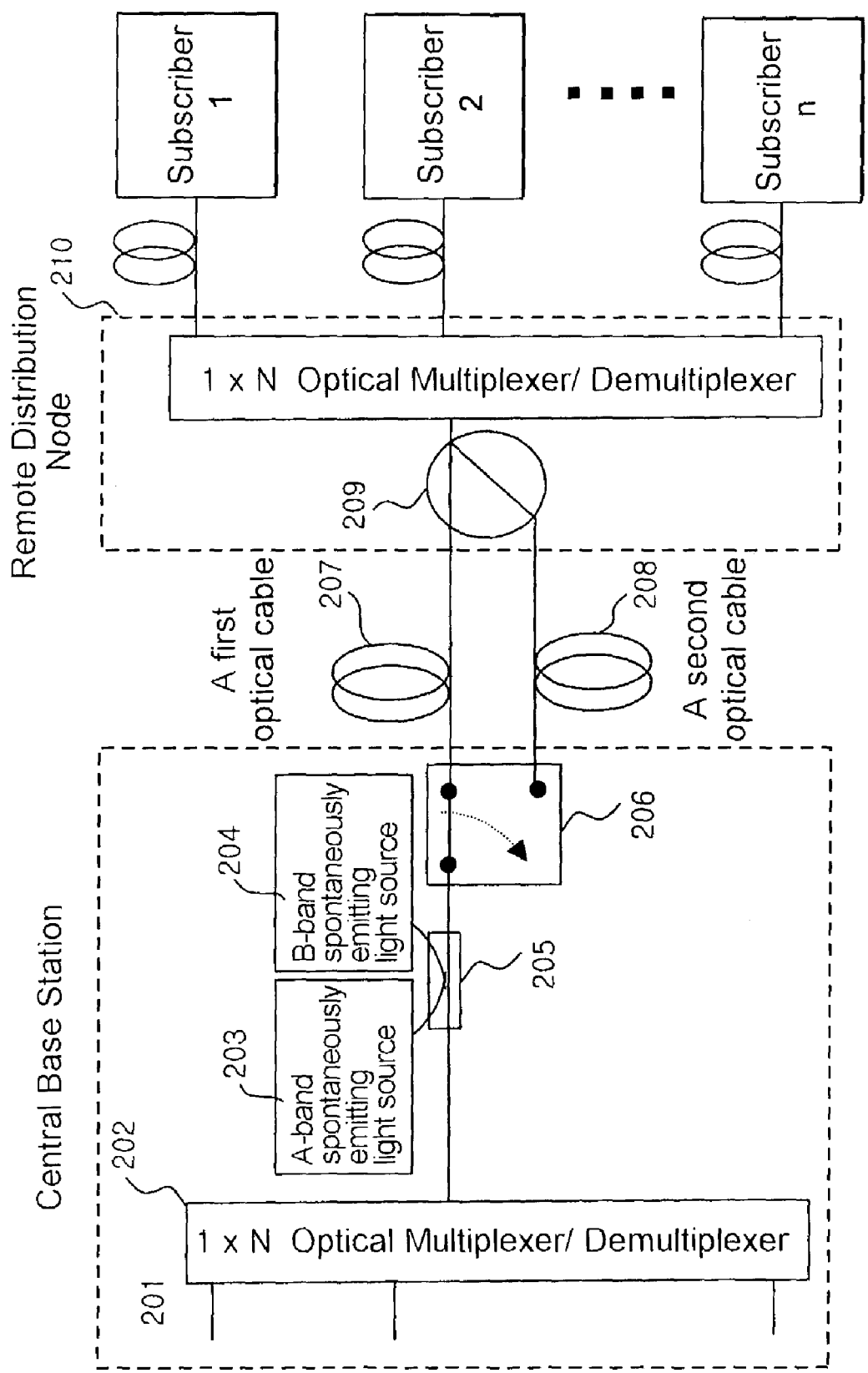
FIG. 2 is a view illustrating a wavelength-division multiplexed passive optical network having a fault recovery function in accordance with the prior art.

As described in FIG. 3, a 4-port optical path setting device of the present invention substitutes a optical coupler (113) in FIG. 1, and thus it decreases the optical loss.

A 4-port optical path setting device of the present invention can be constituted of a single optical device by using micro-optic technology or integrated-optic technology. It can also be constituted of conventional optical devices.

Figure 4:
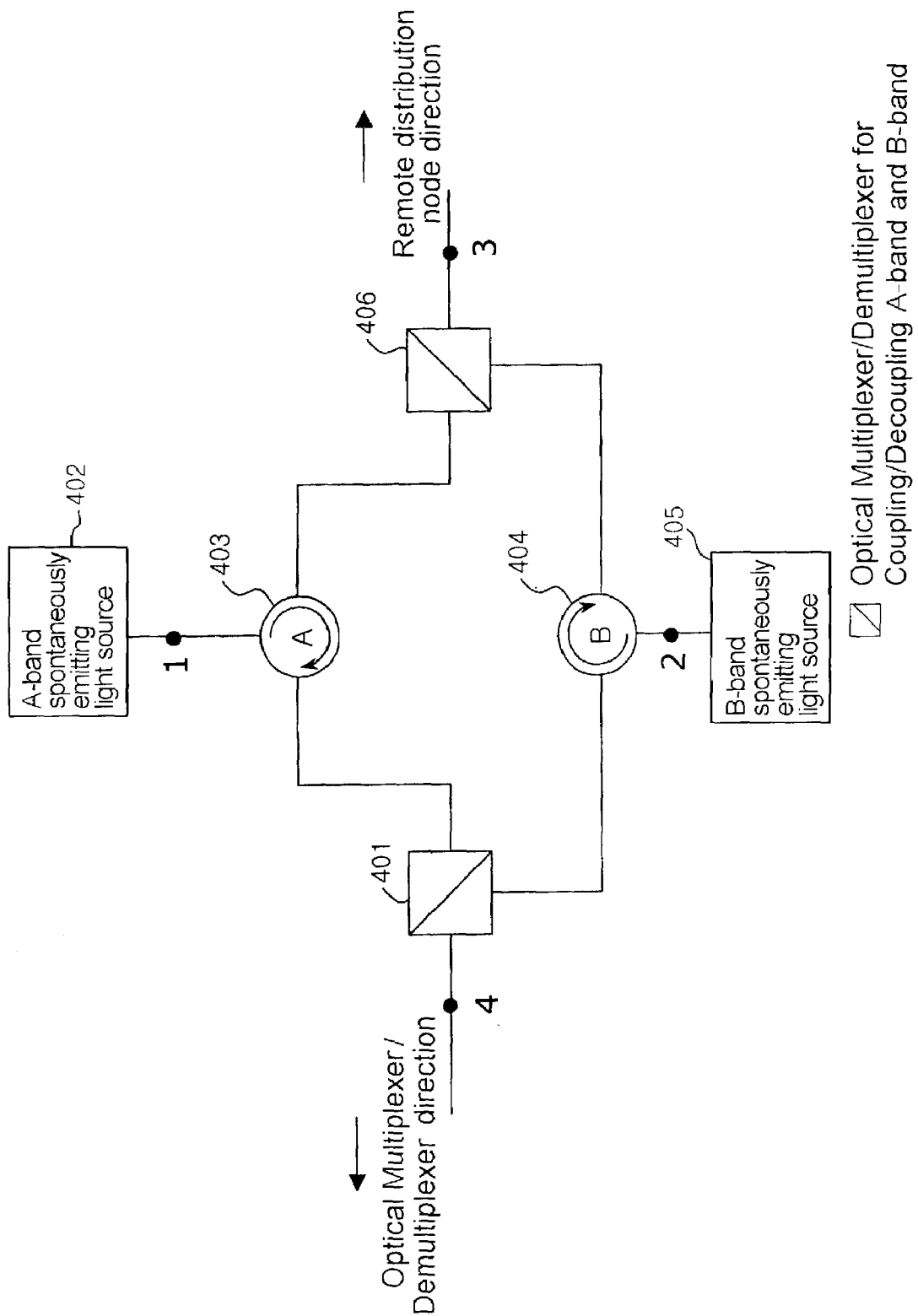
FIG. 4 is a view illustrating an embodiment of a 4-port optical path setting device in accordance with the present invention.

FIG. 4 is a view illustrating an embodiment of a 4-port optical path setting device in accordance with the present invention.

Referring to FIG. 4, it includes optical broadband multiplexers/demultiplexers (401,406) for combining/splitting A-band and B-band, an A-band optical circulator (403) and a B-band optical circulator (404).

An A-band optical signal inputted through #1 port of a 4-port optical path setting device of the present invention is passing through an A-band optical circulator (403) and an optical multiplexer/demultiplexer (406) combining/splitting A-band and B-band and outputted through #3 port.

An A-band optical signal inputted through #3 port of a 4-port optical path setting device is passing through an optical multiplexer/demultiplexer (406) combining/splitting A-band and B-band, an A-band optical circulator (403) and an optical multiplexer/demultiplexer (401) combining/splitting A-band and B-band and outputted through #4 port.

A B-band optical signal inputted through #2 port of a 4-port optical path setting device is passing through a B-band optical circulator (404) and an optical multiplexer/demultiplexer (401) combining/splitting A-band and B-band and outputted through #4 port.

A B-band optical signal inputted through #4 port of a 4-port optical path setting device is passing through an optical multiplexer/demultiplexer (401) combining/splitting A-band and B-band, a B-band optical circulator (404) and an optical multiplexer/demultiplexer (406) combining/splitting A-band and B-band and outputted through #3 port.

Preferably, looking into the case that optical multiplexers/demultiplexers (401,406) for combining/splitting A-band and B-band, an A-band optical circulator (403) and a B-band optical circulator (404), presented in the embodiment of a 4-port optical path setting device of the present invention, have 3 ports respectively. An A-band optical signal inputted through #1 port of an optical multiplexer/demultiplexer (401 or 406) is outputted through #2 port, and an A-band optical signal inputted through #2 port is outputted through #1 port. On the other hand, a B-band optical signal inputted through #1 port of an optical multiplexer/demultiplexer (401 or 406) is outputted through #3 port and a B-band optical signal inputted through #3 port is outputted through #1 port.

Additionally, in a 3-port optical circulator operated in A-band, an A-band optical signal inputted through #1 port is outputted through #2 port and an A-band optical signal inputted through #2 port is outputted through #3 port. Similarly, in a 3-port optical circulator operated in B-band, a B-band optical signal inputted through #1 port is outputted through #2 port and a B-band optical signal inputted through #2 port is outputted through #3 port.

In this case, #1 port of a 4-port optical path setting device is #1 port of an optical circulator (403) operated in A-band and #2 port of a 4-port optical path setting device is #1 port of an optical circulator (404) operated in B-band. #3 port of a 4-port optical path setting device is #1 port of a first optical multiplexer/ demultiplexer (401) and #4 port of a 4-port optical path setting device is #1 port of a second optical multiplexer/demultiplexer (406).

Here, #2 port of an A-band optical circulator (403) is connected to #2 port of a second optical multiplexer/demultiplexer (406), and #3 port of an A-band optical circulator (403) is connected to #2 port of a first optical multiplexer/demultiplexer (401). And #2 port of a B-band optical circulator (404) is connected to #3 port of a first optical multiplexer/demultiplexer (401), and #3 port of a B-band optical circulator (404) is connected to #3 port of a second optical multiplexer/demultiplexer (406).

As described above, a 4-port optical path setting device in accordance with the present invention does not cause any theoretical optical loss except an excess loss occurred in producing processes of individual optical elements. And thus, it can eliminate the theoretical optical loss, typically 3 dB, occurring in the case of using a 2×2 optical splitter (113).

Therefore, by substituting a 4-port optical path setting device in accordance with the present invention for a 2×2 optical splitter (113), the coupling efficiency of the broadband light sources to the fibers can be increased. In addition, the optical transmission loss for the up-stream and the down-stream signals can also be reduced.

Figure 5:
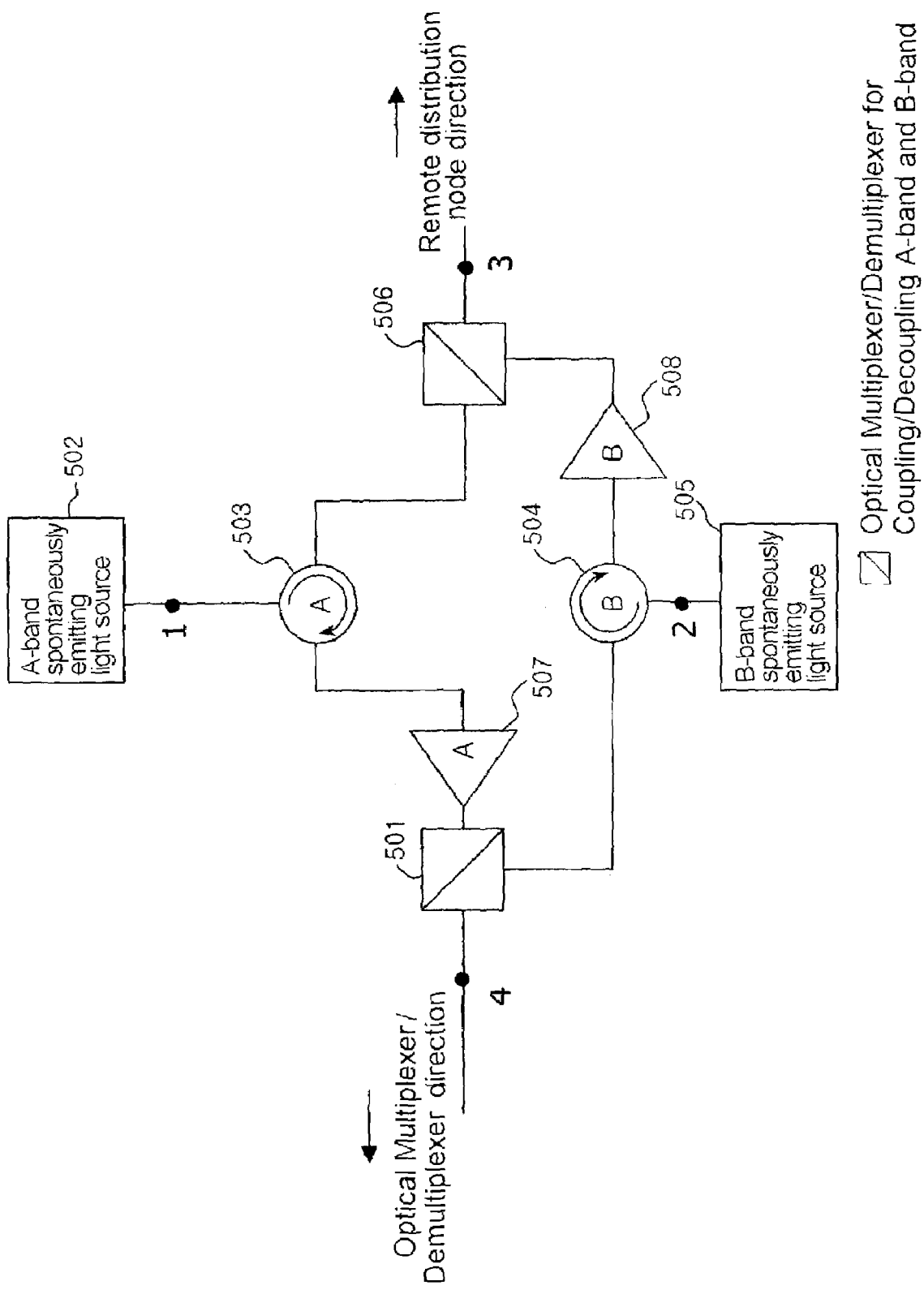
FIG. 5 is a view illustrating another embodiment of a 4-port optical path setting device in accordance with the present invention.

FIG. 5 is a view illustrating an embodiment of a 4-port optical path setting device, capable of compensating the optical loss of up-stream signals and down-stream signals, in accordance with the present invention.

Referring to FIG. 5, it includes optical multiplexers/demultiplexers (501, 506) for combining/splitting A-band and B-band, an A-band optical circulator (503), a B-band optical circulator (504), an optical amplifier (507) for A-band and an optical amplifier (508) for B-band.

A 4-port optical path setting device compensating the optical transmission loss in accordance with the present invention, described in FIG. 5, substitutes a 2×2 optical splitter (113).

A down-way signals in B-band are inputted through #4 port of a 4-port optical path setting device of the present invention, passing through an optical multiplexer/demultiplexer (501) combining/splitting A-band and B-band, a B-band optical circulator (504), a B-band optical amplifier (508) and an optical multiplexer/demultiplexer (506) combining/splitting A-band and B-band, and outputted through #3 port.

A rare-earth material-doped fiber amplifier, a rare-earth material-doped waveguide amplifier, a semiconductor optical amplifier or a fiber amplifier using the non-linearity of optical fiber can be used as a B-band optical amplifier (508). A B-band optical amplifier (508) compensates the optical transmission loss of down-stream signals.

An up-stream signals in A-band are inputted through #3 port of a 4-port optical path setting device of the present invention, passing through an optical multiplexer/demultiplexer (506) combining/splitting A-band and B-band, an A-band optical circulator (503), an A-band optical amplifier (507) and an optical multiplexer/demultiplexer (501) combining/splitting A-band and B-band, and outputted through #4 port.

A rare-earth material-doped fiber amplifier, a rare-earth material-doped waveguide amplifier, a semiconductor optical amplifier or a fiber amplifier using the non-linearity of optical fiber can also be used as an A-band optical amplifier (507). An A-band optical amplifier (507) compensates the optical transmission loss of up-stream signals.

By compensating the optical transmission losses of up-stream signals and down-stream signals, the network system in accordance with the present invention can accommodate more subscribers and increase the transmission distance between a central office and subscribers.

Preferably, looking into the case that optical multiplexers/demultiplexers (501, 506) for combining/splitting A-band and B-band, an A-band optical circulator (503) and a B-band optical circulator (504), presented in the embodiment of a 4-port optical path setting device of the present invention, have 3 ports respectively, an A-band optical signal inputted through #1 port of an optical multiplexer/demultiplexer (501 or 506) is outputted through #2 port, and an A-band optical signal inputted through #2 port is outputted through #1 port. On the other hand, a B-band optical signal inputted through #1 port of an optical multiplexer/demultiplexer (501 or 506) is outputted through #3 port and a B-band optical signal inputted through #3 port is outputted through #1 port.

Additionally, in a 3-port optical circulator operated in A-band, an A-band optical signal inputted through #1 port is outputted through #2 port and an A-band optical signal inputted through #2 port is outputted through #3 port. Similarly, in a 3-port optical circulator operated in B-band, a B-band optical signal inputted through #1 port is outputted through #2 port and a B-band optical signal inputted through #2 port is outputted through #3 port.

In this case, #1 port of a 4-port optical path setting device is #1 port of an optical circulator (503) operated in A-band and #2 port of a 4-port optical path setting device is #1 port of an optical circulator (504) operated in B-band. #3 port of a 4-port optical path setting device is #1 port of a first optical multiplexer/demultiplexer (501) and #4 port of a 4-port optical path setting device is #1 port of a second optical multiplexer/demultiplexer (506).

Here, #2 port of an A-band optical circulator (503) is connected to #2 port of a second optical multiplexer/demultiplexer (506), #3 port of an A-band optical circulator (503) is connected to an input port of an A-band optical amplifier (507), and an output port of an A-band optical amplifier (507) is connected to #2 port of a first optical multiplexer/demultiplexer (501).

And, #2 port of a B-band optical circulator (504) is connected to #3 port of a first optical multiplexer/demultiplexer (501), #3 port of a B-band optical circulator (504) is connected to an input port of a B-band optical amplifier (508), and an output port of a B-band optical amplifier (508) is connected to #3 port of a second optical multiplexer/demultiplexer (506).

Figure 6:
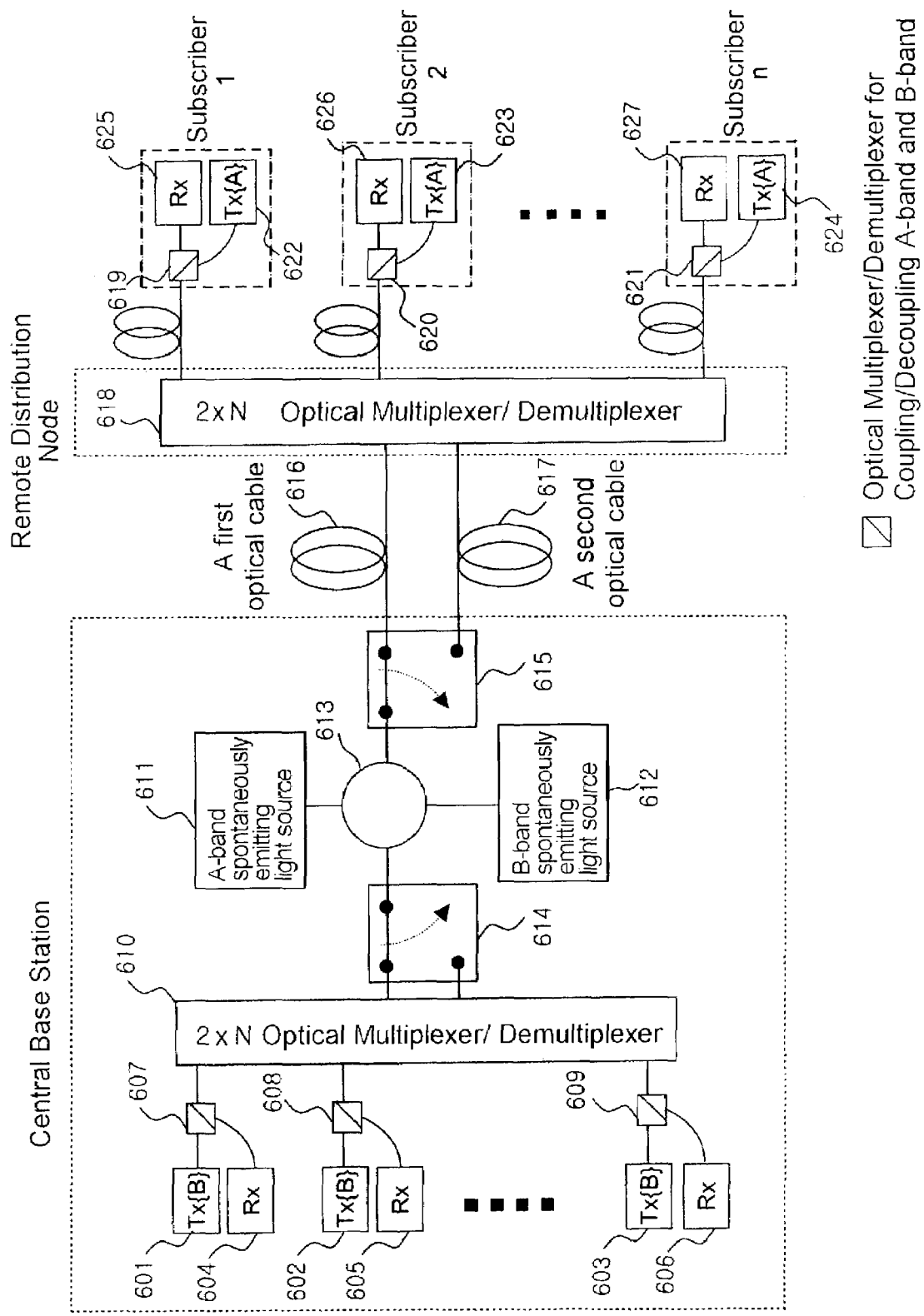
FIG. 6 is a view illustrating a wavelength-division multiplexed passive optical network having a fault recovery function in accordance with the present invention.

FIG. 6 is a view illustrating a wavelength-division multiplexed passive optical network having a fault recovery function in accordance with the present invention.

A wavelength-division multiplexed passive optical network using a wavelength-locked light source described in FIG. 6 includes 2×N optical multiplexers/demultiplexers (610, 618), 1×2 optical spatial switches (614, 615), and the first optical fiber cable (616), and the second optical fiber cable (617), That is to say, it comprises a central office having a 2×N optical multiplexer/demultiplexer (610), two 1×2 optical spatial switches (614, 615) and a 4-port optical path setting device (613); a first optical cable (616) for connecting the central office to a remote distribution node in normal operation state; a second optical cable (617) for connecting during a fault recovery; and a remote distribution node having a 2×N optical multiplexer/demultiplexer (618).

Here, a 1×2 optical spatial switch (614) at the central office connects a port of the right two ports of the 2×N optical multiplexer/demultiplexer (610) at the central office to the 4-port optical path setting device (613), and a 1×2 optical spatial switch (615) connects the 4-port optical path setting device (613) to one of the two cables, a first optical cable (616) or a second optical cable (617).

Optical devices, manufactured by using integrated-optic technology, micro-optic technology and/or optical fiber technology, are used as 2×N optical multiplexers/demultiplexers (610, 618). For a representative example, an arrayed-waveguide grating multiplexer (AWG) is being used. The operation characteristics of an AWG are described in the paper of H. Takahashi, et al., "Transmission characteristics of arrayed-waveguide N×N wavelength multiplexer", *IEEE Photonic Technology Letters*, vol. 13, pp. 447–455.

As described in FIG. 6, the present invention can eliminate a optical coupler (209) in a remote distribution node of a fault recovery network, and thus it can avoid the optical loss of the optical coupler.

Referring to FIG. 6, the operation principles and effects of a network system in accordance with the present invention can be explained as follows:

In normal case, the 1×2 optical spatial switch (614) at the central office connects between the upper port of right two ports at the 2×N optical multiplexer/demultiplexer (610) and the #4 port of 4-port optical path setting device. The 1×2 optical spatial switch (615) connects between the first optical cable (617) and the #3 port of 4-port optical path setting device.

In case that a fault is occurred in the first optical cable (616), the 1×2 optical spatial switch (614) at the central office connects between the lower port of right two ports at the 2×N optical multiplexer/demultiplexer (610) and the #4 port of 4-port optical path setting device. The 1×2 optical spatial switch (615) connects between the second optical cable (617) and the #3 port of 4-port optical path setting device.

Since the transfer wavelength between the input port and the output port of optical multiplexers/demultiplexers (610, 618) are changed when the connecting ports of the optical multiplexers/demultiplexers are changed, the output wavelengths of optical transmitters (601~603) of the central office and the optical transmitters (622–624) of subscribers should be changed. However, an optical transmitter of the present invention self-aligns the operating wavelength to the wavelength spectrally sliced by the optical multiplexer/demultiplexers, and thus it has an advantage that the wavelength assignment can be automatically achieved by synchronization even when the connecting ports of optical multiplexers/demultiplexers are changed.

The present invention has been explained based on preferable embodiments thereinbefore, however, those having ordinary knowledge and skill in the art of the present invention will recognize additional modifications and applications within the scope thereof. Thus, the present invention is not limited to the embodiments and drawings described above.

As mentioned thereinbefore, the present invention presents a network system that can compensate as well as decrease the optical loss at a prior wavelength-division multiplexed passive optical network based on wavelength-locked wavelength-division-multiplexed light sources.

A 4-port optical path setting device in accordance with the present invention can be constituted of conventional optical elements with low-cost. In addition, a wavelength-division multiplexed passive optical network in accordance with the present invention can accomplish a fault recovery function without an additional optical loss.

In a wavelength-division multiplexed passive optical network, optical transmission loss is an important factor to limit the transmission distance and the number of subscribers possibly being accommodated. And thus, the economic feature of a wavelength-division multiplexed passive optical network can be improved by increasing the transmission distance and the number of subscribers with decreasing and compensating the optical transmission loss.

What is claimed is:

1. A method for decreasing and compensating the optical transmission loss at a wavelength-division multiplexed passive optical network characterized by using a 4-port optical path setting device for handling A-band optical signals and B-band optical signals, wherein numbers of wavelengths are included in each band respectively, characterized in that:
   an A-band optical signal inputted through #1 port of said 4-port optical path setting device is outputted through #3 port, an A-band optical signal inputted through #3 port of said 4-port optical path setting device is outputted through #4 port; and
   a B-band optical signal inputted through #2 port of said 4-port optical path setting device is outputted through #4 port and a B-band optical signal inputted through #4 port of said 4-port optical path setting device is outputted through #3 port.

2. An apparatus for decreasing the transmission loss at a wavelength-division multiplexed passive optical network characterized by using a 4-port optical path setting device for handling A-band optical signals and B-band optical signals, wherein numbers of wavelengths are included in each band respectively, characterized in that said 4-port optical path setting device comprises:
   a first optical multiplexer/demultiplexer for multiplexing/demultiplexing A-band and B-band optical signals,
   a second optical multiplexer/demultiplexer for multiplexing/demultiplexing A-band and B-band optical signals,
   a 3-port optical circulator operated in A-band; and
   a 3-port optical circulator operated in B-band;
   characterized in that:
   #1 port of said 4-port optical path setting device is #1 port of said optical circulator operated in A-band;
   #2 port of said 4-port optical path setting device is #1 port of said optical circulator operated in B-band;
   #3 port of said 4-port optical path setting device is #1 port of said first optical multiplexer/demultiplexer;
   #4 port of said 4-port optical path setting device is #1 port of said second optical multiplexer/demultiplexer; and
   #2 port of said A-band optical circulator is connected to #2 port of said first optical multiplexer/demultiplexer;
   #3 port of said A-band optical circulator is connected to #2 port of said second optical multiplexer/demultiplexer;
   #2 port of said B-band optical circulator is connected to #3 port of said second optical multiplexer/demultiplexer; and
   #3 port of said B-band optical circulator is connected to #3 port of said first optical multiplexer/demultiplexer.

3. An apparatus for decreasing the transmission loss at a wavelength-division multiplexed passive optical network characterized by using a 4-port optical path setting device for handling A-band optical signals and B-band optical signals, wherein numbers of wavelengths are included in each band respectively, characterized in that said 4-port optical path setting device comprises:
   a first optical multiplexer/demultiplexer for multiplexing/demultiplexing A-band and B-band optical signals,
   a second optical multiplexer/demultiplexer for multiplexing/demultiplexing A-band and B-band optical signals,
   a 3-port optical circulator operated in A-band;
   a 3-port optical circulator operated in B-band;
   an optical amplifier operated in A-band; and
   an optical amplifier operated in B-band;
   characterized in that:
   #1 port of said 4-port optical path Setting device is #1 port of said optical circulator, operated in A-band;
   #2 port of said 4-port optical path setting device is #1 port of said optical circulator operated in B-band;

3 port of said 4-port optical path setting device is #1 port of said first optical multiplexer/demultiplexer;
second optical multiplexer/demultiplexer; and
2 port of said A-band optical circulator is connected to #2 port of said first optical multiplexer/demultiplexer;
3 port of said A-band optical circulator is connected to an input port of said A-band optical amplifier;
an output port of said A-band optical amplifier is connected to #2 port of said second optical multiplexer/demultiplexer;
2 port of said B-band optical circulator is connected to #3 port of said second optical multiplexer/demultiplexer;
3 port of said B-band optical circulator is connected to an input port of said B-band optical amplifier; and
an output port of said B-band optical amplifier is connected to #3 port of said first optical multiplexer/demultiplexer.

4. An apparatus for decreasing the transmission loss at a wavelength-division multiplexed passive optical network as claimed in claim 3, wherein said optical amplifiers operated in A-band and B-band are the ones selected among rare-earth material-doped fiber amplifiers, rare-earth material-doped waveguide amplifiers, semiconductor amplifiers or fiber amplifiers using the non-linearity of optical fiber.

5. A wavelength-division multiplexed passive optical network system using a wavelength-locked optical signal by an injected incoherent light, which has a fault recovery function for the case of a fault being occurred between a central office and a remote distribution node, characterized by comprising:
a central office having a 2'N optical multiplexer/demultiplexer, a first 1'2 optical spatial switch, a second 1'2 optical spatial switch and a 4-port optical path setting device;
a first optical cable for connecting said central office and said remote distribution node in normal operation state;
a second optical cable for bypassing during a fault recovery; and
a remote distribution node having a 2'N optical multiplexer/demultiplexer;
wherein said first 1×2 optical spatial switch at said central office is connecting a port of the two ports of said 2×N optical multiplexer/demultiplexer at said central office to said 4-port optical path setting device; and said second 1×2 optical spatial switch at said central office is connecting said 4-port optical path setting device to one of said two optical cables, a first optical cable or a second optical cable.

6. A wavelength-division multiplexed passive optical network system as claimed in claim 5, characterized in that optical elements, manufactured by using integrated-optic technology, micro-optic technology, optical fiber technology, and/or arrayed-waveguide grating multiplexers (AWGs), are used as said 2×N optical multiplexer/demultiplexers.

7. A wavelength-division multiplexed passive optical network system as claimed in claim 5, characterized by switching the connection states of said first 1'2 optical spatial switch and said second 1'2 optical spatial switch, when a fault is being occurred in said optical network, and thereby controlling the optical path so that the input port setting of said the second optical cable for bypassing and said 2'N optical multiplexers/demultiplexers of said central base station and said remote distribution node can be changed with being synchronized.

8. A wavelength-division multiplexed passive optical network system as claimed in claim 5, characterized in that an output-wavelength of the optical transmitter is changed according to the wavelength change of injected incoherent light during a trouble recovery of said optical network.

* * * * *